(12) United States Patent
Handgen

(10) Patent No.: US 8,244,983 B2
(45) Date of Patent: Aug. 14, 2012

(54) MEMORY CONTROL SYSTEMS WITH DIRECTORY CACHES AND METHODS FOR OPERATION THEREOF

(75) Inventor: Erin A. Handgen, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1113 days.

(21) Appl. No.: 11/554,383

(22) Filed: Oct. 30, 2006

(65) Prior Publication Data

US 2008/0104331 A1    May 1, 2008

(51) Int. Cl.
*G06F 12/00* (2006.01)
*G06F 12/08* (2006.01)
*G06F 13/00* (2006.01)

(52) U.S. Cl. ............ 711/133; 711/118; 711/130; 711/3; 711/141; 711/143; 711/144; 711/145

(58) Field of Classification Search .................. 711/133, 711/118, 130, 3, 141, 143, 144, 155
See application file for complete search history.

(56) References Cited

U.S. PATENT DOCUMENTS

| | | | | |
|---|---|---|---|---|
| 5,016,168 A * | 5/1991 | Liu | ............... | 712/216 |
| 6,078,997 A | 6/2000 | Young et al. | | |
| 2002/0002659 A1* | 1/2002 | Michael et al. | ............... | 711/141 |
| 2005/0251626 A1 | 11/2005 | Glasco | | |
| 2008/0040555 A1* | 2/2008 | Iyer et al. | ............... | 711/133 |
| 2008/0086602 A1* | 4/2008 | Guthrie et al. | ............... | 711/144 |

FOREIGN PATENT DOCUMENTS

EP    1 304 621 A2    4/2004

* cited by examiner

*Primary Examiner* — Midys Rojas

(57) ABSTRACT

A memory control system is provided with a directory cache and a memory controller. The directory cache has a plurality of directory cache entries configured to store information regarding copies of memory lines stored in a plurality of memory caches, wherein each directory cache entry has one or more bits configured to store an ownership state that indicates whether a corresponding master directory entry lacks a memory cache owner. The memory controller is configured to free for re-use ones of the directory cache entries by 1) accessing a particular directory entry, and 2) determining whether the ownership state of the particular directory cache entry indicates that a corresponding master directory entry lacks a memory cache owner. If so, the memory controller A) skips a master directory update process, and B) claims for re-use the particular directory cache entry.

20 Claims, 4 Drawing Sheets

MEMORY CONTROL SYSTEMS WITH DIRECTORY CACHES AND METHODS FOR OPERATION THEREOF

BACKGROUND

Large multiple processor computing systems often employ a directory cache that caches or stores a copy of information contained in a master directory. The master directory typically contains information regarding copies of memory lines that are stored in the system's various caches. For example, the information stored in a master directory (and thus the directory cache) may comprise information indicating 1) where copies of memory lines are stored, 2) whether the memory lines are stored in single or multiple locations, and 3) whether a memory line has been reserved for exclusive access by a particular cache (meaning that the memory line may be subject to modification).

A directory cache can be useful in that it reduces the number of main memory accesses (and particularly writes) that are undertaken solely for the purpose of keeping the master directory up-to-date (i.e., it reduces memory accesses that do not result in a memory line actually being updated). This can yield both increased effective memory bandwidth and reduced memory power consumption.

BRIEF DESCRIPTION OF THE DRAWINGS

Illustrative and presently preferred exemplary embodiments of the invention are shown in the drawings in which.

DETAILED DESCRIPTION

Figure 1:
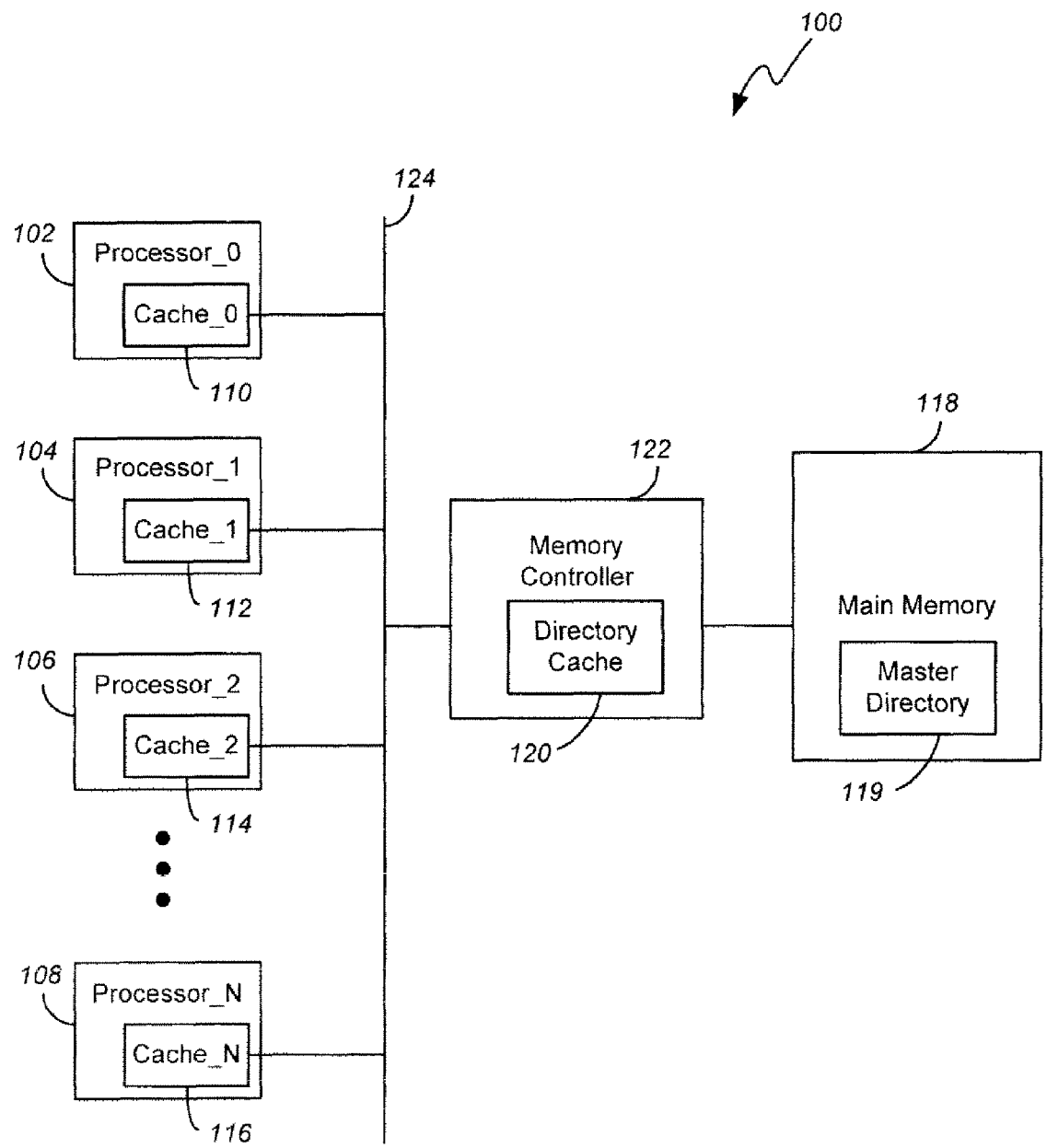
FIG. 1 is a schematic representation of an exemplary multiple processor computing system.

One embodiment of a multiple processor computing system 100 is illustrated in FIG. 1 and may comprise a plurality of processors 102, 104, 106, and 108 that are provided with respective local memory caches 110, 112, 114, and 116. System 100 may also be provided with a main memory 118, which, in one embodiment, may comprise one or more dual in-line memory modules (DIMMs), although other types of memory may be utilized. System 100 may also comprise a master directory 119, a directory cache 120, and at least one memory controller 122. The various components and/or devices may be connected to a system bus 124 in the manner illustrated in FIG. 1.

As will be described in greater detail below, the various local memory caches 110, 112, 114, and 116 of respective processors 102, 104, 106, and 108 may be used to store or cache lines of memory copied from main memory 118. Master directory 119 may contain, among other information, information that relates to the copies of memory lines that are stored in the various local processor caches 110, 112, 114, and 116. Such information may be referred to herein in the alternative as "master directory entries." The directory cache 120 stores or caches information contained in master directory 119 (i.e., the master directory entries). Directory cache 120 also contains information that relates to the "ownership states" of the master directory entries.

In the embodiment illustrated in FIG. 1, directory cache 120 is distributed in memory controller 122, whereas the master directory 119 is stored in main memory 118. Alternatively, other configurations are possible, as would become apparent to persons having ordinary skill in the art after having become familiar with the teachings provided herein. For example, in another configuration, the directory cache 120 could be an integrated cache, existing in a single location, and need not be distributed in the memory controller 122 (or memory controllers if several memory controllers are provided). Similarly, the master directory 119 need not be stored in main memory 118.

As will be described in further detail herein, the memory controller 122 coordinates the movement of memory lines and directory information between the main memory 118, local memory caches 110, 112, 114, 116, master directory 119, and directory cache 120.

Figure 2:
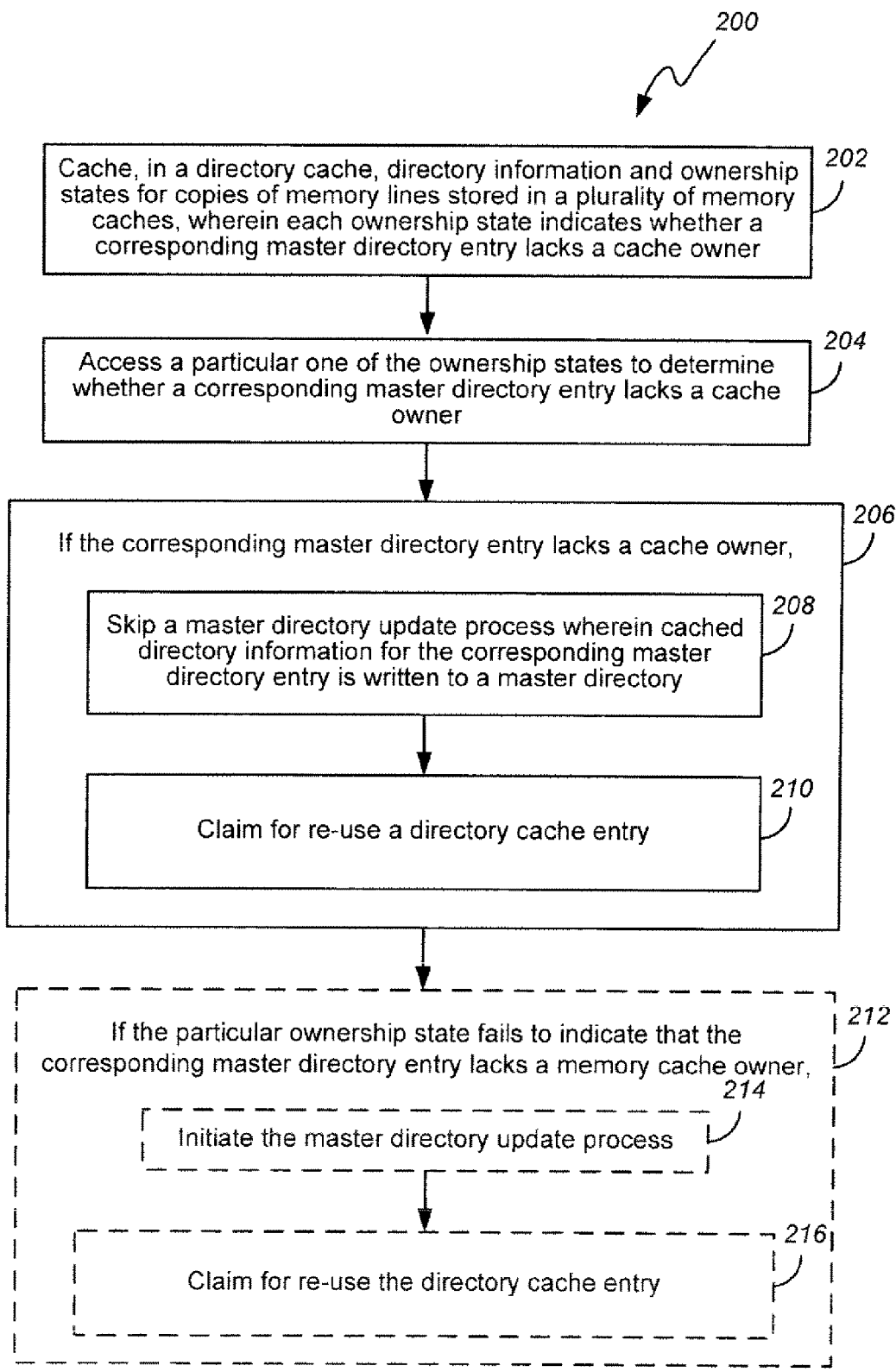
FIG. 2 illustrates an exemplary method for maintaining memory lines and directory information in a system such as the system shown in FIG. 1.

FIG. 2 illustrates an exemplary method 200 for maintaining memory lines and directory information in a system such as the system 100. In accordance with the method 200, directory information and ownership states for corresponding master directory entries are cached in directory cache 120 (block 202). Each of the ownership states in directory cache 120 indicates whether a corresponding master directory cache 120 indicates whether a corresponding master directory entry (i.e., directory entry in master directory 119) lacks a cache owner.

During operation of system 100, a particular ownership state in the directory cache 120 may be accessed to determine whether a corresponding master directory entry lacks a memory cache owner (block 204). If the corresponding master director entry lacks a cache owner (and if the directory cache 120 indicates that the memory line still lacks a cache owner, as discussed below) (block 206), then 1) a directory update process (e.g., wherein cached directory information for the corresponding master directory entry is written to the master directory 119), is skipped (block 208), and 2) the directory cache entry is claimed for re-use (block 210).

Stated another way, when a processor cache (e.g., 110, 112, 114, and 116) has "clean" (i.e., unmodified) copies of main memory (e.g., a memory line) that are no longer needed, the respective processor (e.g., 102, 104, 106, and 108) casts out the memory line. When this happens, the memory controller 122 is notified and the directory cache 120 is updated to indicate that the particular processor casting out the memory line no longer "owns" the memory line. If the memory controller 122 receives such a cast out notification from a processor cache that had exclusive ownership of the memory line and the ownership state of the directory cache 120 indicates that no other device owns the memory line, then the directory cache entry can be reclaimed without having to update the master directory 119. On the other hand, if the memory controller 122 receives a cast out notification and the ownership state of the directory cache 120 indicates that another device owns the memory line, then the master directory 119 needs to be updated.

In addition to, or instead of, enabling directory cache lines to be claimed for re-use, the method 200 can be expanded to enable the memory controller 122 to update the master directory 119. To this end, if the ownership state fails to indicate that a corresponding master directory entry lacks a memory cache owner (block 212), then memory controller 122 may initiate a master directory update process (block 214), and optionally claim for re-use the directory cache entry (block 216).

Figure 3:
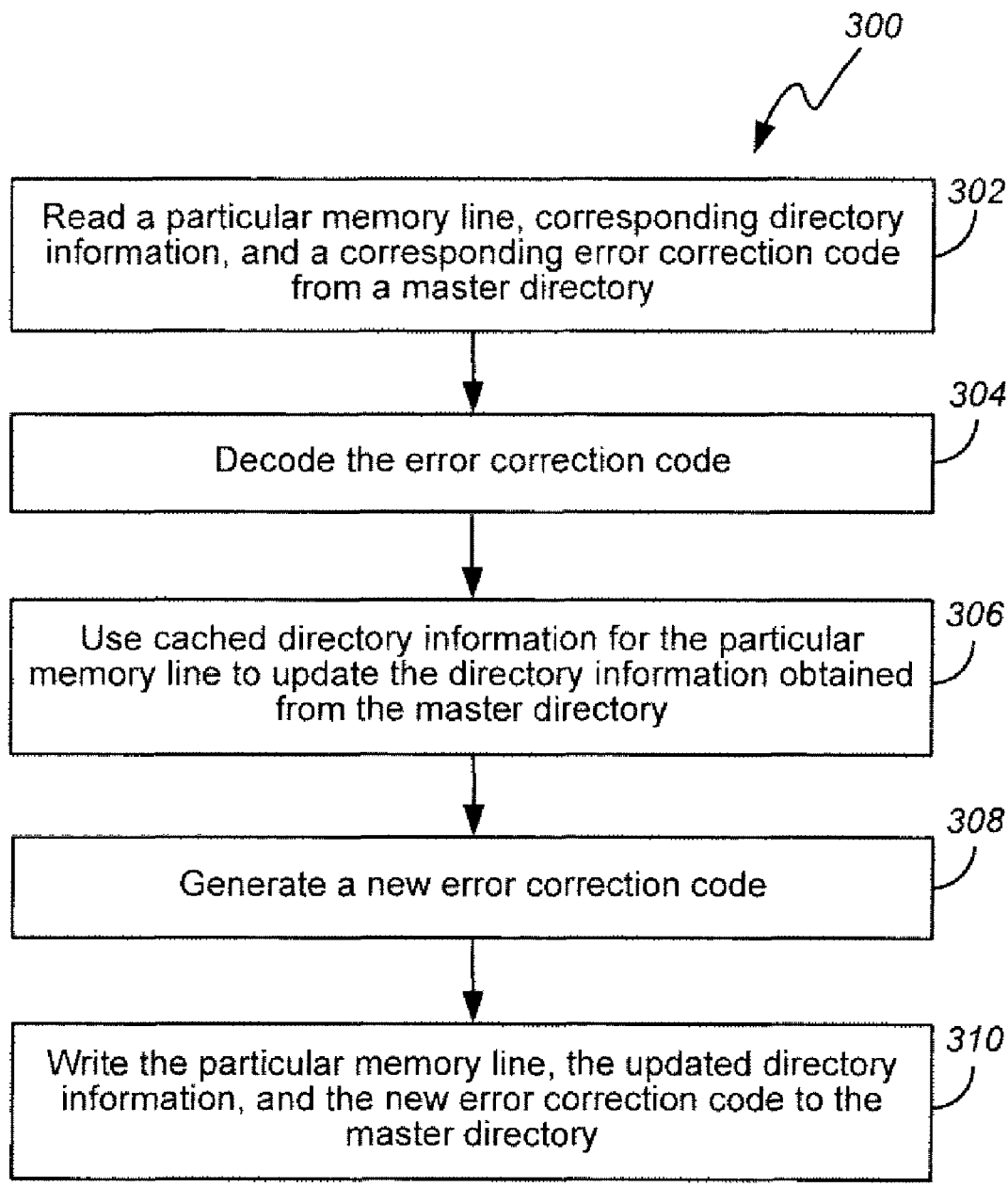
FIG. 3 illustrates an exemplary embodiment of a "master directory update process.

FIG. 3 illustrates an exemplary embodiment 300 of the afore-mentioned "master directory update process." The process 300 comprises reading from the master directory 119: 1) a particular memory line, and 2) corresponding directory information. If the system 100 is provided with error correction code (ECC), then process 300 may also include reading a corresponding error correction code (ECC; block 302). The ECC is then decoded (block 304), and directory information cached in the directory cache 120 is used to update the directory information obtained from the master directory 119 (block 306). Subsequently, a new ECC is generated for the updated directory information (block 308), and A) the particular memory line, B) the updated directory information, and C) the new ECC, are all written back into the master directory 119 (block 310).

Of note, the above-described master directory update process 300 is slow, relatively speaking, because it entails a read and a write of a memory line. The read of the memory line is needed because an error correction code typically factors in the state of a memory line, such that a new ECC cannot be generated without first reading its associated memory line. And, once the memory line is read, memory coherence protocols (and cache controller hardware) typically require that it be re-written. However, by virtue of the method 200, the somewhat time-consuming master directory update process can often be skipped. The process can be skipped often because the memory lines that are copied into caches typically do not have an owner.

Figure 4:
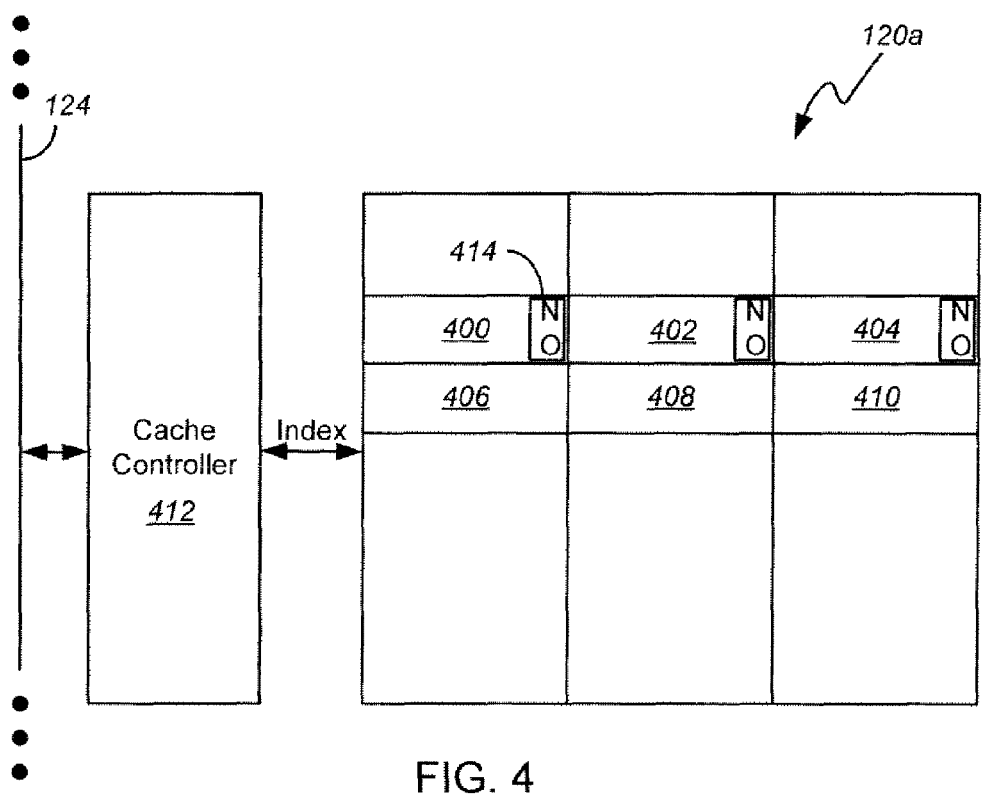
" and FIG. 4 illustrates an exemplary directory cache that may be used when implementing the methods shown in FIGS. 2 and 3.

FIG. 4 illustrates an exemplary embodiment 120a of the directory cache 120 (FIG. 1) as it might be configured to implement the methods 200 and 300 (FIGS. 2 and 3). The directory cache 120a comprises means, such as a plurality of directory entries 400, 402, 404, 406, 408, 410, to store information regarding copies of memory lines that are stored in a plurality of caches 110, 112, 114, 116 (FIG. 1).

In one embodiment, the information stored in some or all of the directory entries 400, 402, 404, 406, 408, 410 may comprise part of all of a share vector. In some cases, the state of each bit of the share vector may indicate whether a copy of a memory line is, or is not, stored in a particular cache 110, 112, 114, 116. In these cases, a request to modify a memory line may result in each of the caches identified by the share vector being notified that their copy of the memory line needs to be marked invalid. In other cases, the state of each bit of the share vector may indicate whether a copy of a memory line is, or is not, stored in a particular group of caches. In these cases, a request to modify a memory line may result in each cache in each of the cache groups identified by the share vector being notified that their copy of the memory line needs to be marked invalid.

The memory controller 122 may populate ones of the directory entries 400, 402, 404, 406, 408, 410, by, upon copying a given memory line from main memory 118 to one of the plurality of memory caches 110, 112, 114, 116, 1) storing directory information for the given memory line in a given one of the directory entries 400, 402, 404, 406, 408, 410, and 2) updating the one or more bits of the directory entry that stores the ownership state for the given memory line.

Although the directory cache 120a is shown to be an integrated cache, wherein all of the directory's entries 400, 402, 404, 406, 408, 410 are stored in a single location, the directory cache 120a could alternately be implemented as a distributed cache, wherein the directory's entries are distributed among dedicated or non-dedicated directory space provided in two or more discrete locations. In one embodiment, the directory cache 120a may be configured as an N-way set associative cache, wherein the directory's entries 400, 402, 404, 406, 408, 410 are divided into sets of N entries (e.g., 400, 402, 404). As shown, each set of N entries is addressable by means of an index.

The exemplary directory cache 120a also comprises a cache controller 412. In response to an index associated with a particular memory line (e.g., a portion of a memory address), the cache controller 412 retrieves the set of N entries 400, 402, 404 that are associated with the index. The cache controller 412 then compares an "address tag" associated with a particular memory line (e.g., another portion of the memory address) with address tags stored in one or more bits of each of the retrieved directory entries 400, 402, 404. If an address tag of one of the retrieved entries 400 corresponds to the address tag associated with the particular memory line, the cache controller 412 returns the matching directory entry 400 to an inquiring memory controller 122 (FIG. 1). Means such as the memory controller 122 may then determine whether the ownership state 414 of the entry 400 indicates that a corresponding master directory entry lacks a memory cache owner. If so, the memory controller 122 1) skips a master directory update process wherein directory information stored in the directory entry 400 is written to the corresponding master directory entry, and 2) claims the cache directory entry 400 for re-use.

In one embodiment, the memory controller 122 makes a determination regarding the ownership state of a directory entry when a memory cache 110, 112, 114, 116 notifies the memory controller 122 of a clean cast-out of its copy of a memory line.

Preferably, each ownership state 400 is stored using a single bit. However, an ownership state could also be stored using multiple bits (or could be stored as part of a multi-bit, encoded value).

When the memory controller 122 claims a directory entry 400 for re-use, it may do so by marking the directory entry invalid. In one embodiment, a directory entry is marked invalid by setting an invalid bit.

The invention claimed is:

1. A memory control system, comprising:
   a master directory associated with memory and comprising master directory entries to store information regarding copies of memory lines stored in a plurality of memory caches;
   a directory cache to cache directory information of at least some of the master directory entries in the master directory such that the directory information of the at least some of the master directory entries is present in both the directory cache and the master directory, wherein the directory cache has a plurality of directory cache entries to store the directory information of the at least some master directory entries, and wherein each directory cache entry comprises one or more bits configured to store an ownership state that indicates whether a corresponding master directory entry lacks a memory cache owner; and
   a memory controller configured to free for re-use ones of the directory cache entries by,
      accessing a particular directory cache entry;
      determining whether the ownership state of the particular directory cache entry indicates that a corresponding master directory entry lacks a memory cache owner, and if so, then i) skipping a master directory update process wherein directory information stored in the particular directory cache entry is written to the master directory, and ii) claiming for re-use the particular directory cache entry, wherein, if the ownership state of the particular directory cache entry fails to indicate that the corresponding master directory entry lacks a memory cache owner, then the memory controller is configured to i) initiate the master directory update process wherein directory information stored in the particular directory cache entry is written to the master directory, and ii) claim for re-use the particular directory cache entry.

2. The memory control system of claim 1, wherein the master directory update process comprises:
    reading, as part of the master directory update process, a particular memory line from the memory and corresponding master directory information from the master directory;
    using directory information stored in the particular directory cache entry to update the master directory information; and
    writing the particular memory line and updated master directory information to the master directory.

3. The memory control system of claim 2, wherein the memory controller is to further:
    read an error correction code that corresponds to the particular memory line and corresponding master directory information;
    decode the error correction code;
    generate a new error correction code based on the updated master directory information and the particular memory line; and
    write the new error correction code to the master directory.

4. The memory control system of claim 1, wherein the memory controller is configured to claim for re-use the particular directory cache entry by marking the particular directory cache entry invalid.

5. The memory control system of claim 4, wherein the memory controller is configured to mark the particular directory cache entry invalid by setting an invalid bit.

6. The memory control system of claim 1, wherein the memory controller is configured to populate at least one of the directory cache entries by, upon copying a given memory line from the memory to one of the plurality of memory caches, i) storing directory information for the given memory line in a given one of the directory cache entries, and ii) updating the one or more bits of the given directory cache entry that store the ownership state for the corresponding master directory entry.

7. The memory control system of claim 1, wherein the master directory is maintained in one or more memory modules.

8. The memory control system of claim 1, wherein:
    the directory cache entries are divided into sets of N entries, with each set of N entries being addressable via an index; and
    each directory cache entry comprises a plurality of bits to store an address tag of a memory line stored therein.

9. The memory control system of claim 1, wherein the plurality of directory cache entries are integrated with the memory controller.

10. The memory control system of claim 1, wherein the master directory update process further includes reading data of a memory line of the memory.

11. A memory control system, comprising:
    a master directory associated with memory, wherein the master directory includes master directory entries to store directory information regarding copies of memory lines stored in a plurality of memory caches;
    a directory cache to cache directory information of at least some of the master directory entries such that the directory information of the at least some of the master directory entries are present in both the directory cache and the master directory, the directory cache having directory cache entries containing ownership states for corresponding master directory entries, wherein each ownership state indicates whether a corresponding master directory entry lacks a memory cache owner;
    a memory controller configured to free for re-use a particular directory cache entry by:
        accessing a particular one of the ownership states in the particular directory cache entry to determine whether the corresponding master directory entry lacks a memory cache owner;
        if the corresponding master directory entry lacks a memory cache owner, i) skip a master directory update process in which directory information stored in the particular directory cache entry is written to the master directory, and ii) claim for re-use the particular directory cache entry; and
        if the particular ownership state indicates that the corresponding master directory does not lack a memory cache owner, i) initiate the master directory update process in which directory information stored in the particular cache entry is written to the master directory, and ii) claim for re-use the particular directory cache entry.

12. The memory control system of claim 11, wherein the master directory update process further includes reading data of a memory line of the memory.

13. A method, comprising:
    storing, in a master directory associated with memory, master directory entries containing directory information regarding copies of memory lines stored in a plurality of memory caches;
    caching, in a directory cache, directory information of at least some of the master directory entries so that the directory information of the at least some of the master directory entries is present in both the directory cache and master directory, and wherein the directory cache contains ownership states for copies of memory lines stored in the plurality of memory caches, and wherein each ownership state indicates whether a corresponding memory line lacks a memory cache owner;
    accessing a particular one of the ownership states to determine whether a corresponding particular memory line lacks a memory cache owner;
    if the particular memory line lacks a memory cache owner, i) skipping a master directory update process in which directory information stored in a corresponding directory cache entry is written to the master directory, and ii) claiming for re-use the corresponding directory cache entry in which the directory information for the particular memory line was cache;
    if the particular ownership state fails to indicate that the particular memory line lacks a memory cache owner, then i) initiating the master directory update process, and ii) claiming for re-use the corresponding directory cache entry in which the directory information for the particular memory line was cached.

14. The method of claim 13, wherein the master directory update process comprises:
    reading, as part of the master directory update process, the particular memory line from the memory, corresponding master directory information, and a corresponding error correction code from the master directory;
    decoding the error correction code;

using the cached directory information for the particular memory line to update the master directory information;

generating a new error correction code based on the updated master directory information and particular memory line; and writing the particular memory line, updated master directory information, and new error correction code to the master directory.

15. The method of claim 13, wherein a directory cache entry is claimed for re-use by marking it invalid.

16. The method of claim 13, wherein the directory cache is populated by, upon copying a given memory line from the memory to one of the plurality of memory caches, storing in the directory cache directory information and an ownership state for the given memory line in the master directory.

17. The method of claim 13, wherein a particular memory line is determined to lack a memory cache owner when one of the memory caches indicates it has initiated a clean cast-out of its copy of the particular memory line.

18. The method of claim 13, wherein the master directory update process further includes reading data of a memory line of the memory.

19. A memory control system, comprising:

a master directory associated with memory and comprising master directory entries to store information regarding copies of memory lines stored in a plurality of memory caches;

a directory cache to cache directory information of at least some of the master directory entries in the master directory such that the directory information of the at least some of the master directory entries is present in both the directory cache and the master directory, wherein the directory cache has a plurality of directory cache entries to store the directory information of the at least some master directory entries, and wherein each directory cache entry comprises one or more bits configured to store an ownership state that indicates whether a corresponding master directory entry lacks a memory cache owner; and a memory controller configured to update the master directory by, accessing a particular directory cache entry to determine the ownership state of the corresponding master directory entry;

if the ownership state fails to indicate that the corresponding master directory entry lacks a memory cache owner, then initiating a master directory update process wherein directory information stored in the particular directory cache entry is written to the master directory; and if the ownership state indicates that the corresponding master directory entry lacks a memory cache owner, then skipping the master directory update process.

20. The memory control system of claim 19, wherein the memory controller determines that a particular memory line lacks a memory cache owner when one of the memory caches indicates it has initiated a clean cast-out of its copy of the particular memory line.

* * * * *

UNITED STATES PATENT AND TRADEMARK OFFICE
CERTIFICATE OF CORRECTION

PATENT NO. : 8,244,983 B2  
APPLICATION NO. : 11/554383  
DATED : August 14, 2012  
INVENTOR(S) : Erin A. Handgen Page 1 of 1

It is certified that error appears in the above-identified patent and that said Letters Patent is hereby corrected as shown below:

In column 6, line 54, in Claim 13, delete "cache;" and insert -- cached; --, therefor.

Signed and Sealed this  
Fifteenth Day of January, 2013

David J. Kappos  
*Director of the United States Patent and Trademark Office*